United States Patent [19]

Kondo et al.

[11] 4,187,202

[45] Feb. 5, 1980

[54] PROCESS FOR PREPARING POLYMER RESINS OF HIGH IMPACT RESISTANCE

[75] Inventors: Masatsune Kondo; Akira Tanoue, both of Niihama, Japan

[73] Assignee: Sumitomo Chemical Company, Osaka, Japan

[21] Appl. No.: 709,515

[22] Filed: Jul. 28, 1976

[30] Foreign Application Priority Data

Jul. 30, 1975 [JP] Japan ................................. 50-93577

[51] Int. Cl.$^2$ ..................... C08F 253/00; C08C 1/14; C08F 255/00
[52] U.S. Cl. ............................ 260/4 R; 260/29.6 RB; 260/29.6 RW; 260/29.7 UA; 260/29.7 UP; 260/815; 525/300; 525/301; 525/302; 525/300; 525/301; 525/302; 525/255; 525/261; 525/281; 525/279; 525/282
[58] Field of Search .............. 260/29.6 RB, 29.6 RW, 260/29.7 UA, 4 R, 878 R, 879, 29.7 UP, 880 R, 881, 885, 815

[56] References Cited

U.S. PATENT DOCUMENTS

| | | | |
|---|---|---|---|
| 3,370,105 | 2/1968 | DeBell et al. | 260/880 R |
| 3,652,721 | 3/1972 | Dalton et al. | 260/878 R |
| 3,665,057 | 5/1972 | Tanaka et al. | 260/29.6 RB X |
| 3,714,103 | 1/1973 | Huhn et al. | 260/29.6 RB |
| 3,763,279 | 10/1973 | Kelley | 260/884 |
| 3,767,606 | 10/1973 | Kishikawa et al. | 260/29.6 RB X |
| 3,793,403 | 2/1974 | Dalton et al. | 260/29.7 UP |
| 3,812,205 | 5/1974 | Dunkelberger | 260/885 |
| 3,842,144 | 10/1974 | Tanaka et al. | 260/880 R |
| 3,882,195 | 5/1975 | Daniels et al. | 260/29.6 RB X |

*Primary Examiner*—Wilbert J. Briggs, Sr.
*Attorney, Agent, or Firm*—Birch, Stewart, Kolasch and Birch

[57] ABSTRACT

A process for preparing polymer resins of high impact resistance which comprises coagulating a latex of a rubbery polymer grafted or not with at least one ethylenic monomer in the presence of a suspension stabilizer and a coagulating agent to make a stable aqueous suspension of coagulated particles of said rubbery polymer, adding at least one ethylenic monomer to the aqueous suspension and subjecting the resultant mixture to suspension polymerization.

6 Claims, No Drawings

PROCESS FOR PREPARING POLYMER RESINS OF HIGH IMPACT RESISTANCE

BACKGROUND AND SUMMARY OF THE INVENTION

The present invention relates to a process for preparing polymer resins of high impact resistance. More particularly, it relates to an improved process for preparing highly impact resistant polymer resins by polymerizing at least one ethylenic monomer on a rubbery polymer grafted or not with at least one ethylenic monomer.

For production of thermoplastic polymer resins such as ABS resins (i.e. resins produced from acrylonitrile, butadiene and styrene as the essential monomer components), there is known a process which comprises subjecting a mixture of a rubbery polymer latex and an ethylenic monomer(s) to suspension polymerization in an aqueous medium. As the practical procedure for carrying out such process, there have been made various proposals, among which typical examples are as follows: (1) a procedure which comprises adding a coagulating agent to a mixture of a grafted rubbery polymer latex with acrylonitrile and styrene, adding a suspension stabilizer thereto and subjecting the resultant mixture to suspension polymerization [Japanese Patent Publication No. 25191/1974]; (2) a procedure which comprises adding a rubbery polymer latex to a suspension comprising a suspension stabilizer, a coagulating agent and a vinyl monomer(s) and subjecting the resulting mixture to suspension polymerization [Japanese Patent Publication No. 7454/1972]; (3) a procedure which comprises adding a vinyl monomer(s) and a coagulating agent to a latex of a rubbery polymer grafted or not with a vinyl monomer(s) and, after substantial removal of water, subjecting the resultant mixture to suspension polymerization [Japanese Patent Publication No. 35353/1974], etc.

In the procedure (1), however, the addition of the coagulating agent to a mixture of the rubbery polymer latex and the vinyl monomers results in the rapid combination of the coagulated rubbery polymer with the vinyl monomer(s) to make blocks so that a good and stable dispersion can not be achieved even when the suspension stabilizer is incorporated therein later. This tendency is enhanced with the increase of the amount of the rubbery polymer latex, which causes the increase of the viscosity of the resulting mixture. In the procedure (2), the said trouble is not produced when the amount of the rubbery polymer latex is relatively small. But, the increase of the amount of the rubbery polymer latex produces disadvantageously the coagulation between the particles of the rubbery polymer in the latex and the particles of the vinyl monomer(s) so as to make blocks. In the procedure (3), there are essentially required steps of mixing the rubbery polymer latex and the vinyl monomer(s) and of removing water from the resultant mixture. In addition, the use of a larger amount of the rubbery polymer latex on its mixation with the vinyl monomer(s) results in higher viscosity of the resulting mixture, whereby the transference to the suspension system becomes practically difficult. Summarizing above, these conventional procedures may be operative when the amount of the rubbery polymer is relatively small, but in case of the amount being increased considerably, the practice is hardly possible.

Besides, there is known an improved process which comprises adding a coagulating agent to a latex of a rubbery polymer to make an aqueous dispersion of the coagulated particles of the rubbery polymer, incorporating a suspension stabilizer and then a vinyl monomer(s) thereto and subjecting the resultant mixture to polymerization [Japanese Patent Publication (unexamined) No. 55793/1974]. While this process is applicable to the case wherein the rubbery polymer is a grafted one, it is hardly applicable to the case using a non-grafted rubbery polymer as the rubbery polymer, because the coagulated particles are combined together to form blocks at the coagulation stage.

As the result of an extensive study directed to overcoming the drawbacks as seen in the conventional procedures, there has now been completed the process of the present invention which can achieve an easy and smooth transference to the suspension system without any problem and accomplish successfully the suspension polymerization while maintaining a good and stable suspension state even when the kind and amount of the rubbery polymer are varied within a broad range. Advantageously, the polymer resin prepared by such process has excellent physical properties and is formed in beautiful beads of even size.

The process of the present invention comprises coagulating a latex of a rubbery polymer grafted or not with at least one ethylenic monomer in the presence of a suspension stabilizer and a coagulating agent to make a stable aqueous suspension of coagulated particles of said rubbery polymer, adding at least one ethylenic monomer to the aqueous suspension and subjecting the resultant mixture to suspension polymerization to produce a polymer resin of high impact resistance.

In the process of the present invention, the coagulated particles of the rubbery polymer produced by coagulation of the rubbery polymer latex are kept stably in a uniformly dispersed state by the presence of the suspension stabilizer. Such coagulated particles serve as nuclei for the ethylenic monomer(s) added in the subsequent step and are combined with the ethylenic monomer(s) to form larger particles, which can be stably dispersed and easily polymerized while maintaining a good and stable dispersion state. Advantageously, the said good and stable dispersion state is not substantially influenced by any considerable variation in the polymerization conditions. Thus, the step for coagulation of the rubbery polymer latex is the most important in the process of the invention, and the properties of the coagulated particles produced at this stage determine substantially the size and shape of the polymer beads as ultimately obtained.

For breaking the emulsion state of the rubbery polymer latex to obtain even coagulated particles as stably dispersed, the presence of the suspension stabilizer is a critical factor. Besides, the kind and amount of the suspension stabilizer, the solid content of the rubbery polymer latex, the agitation condition, the amount of the water phase, the coagulation rate of the rubbery polymer latex, the order of addition of the materials and the like may afford an influence thereon to a certain extent. Therefore, the suitable selection of these conditions is desirable for obtaining a good and stable dispersion of the coagulated particles having a desired particle size. For instance, the order of addition of the materials may be as follows; (a) the rubbery polymer latex is added to a water phase comprising the suspension stabilizer and the coagulating agent for coagulation; (b) the coagulating agent is added to a water phase comprising the rubbery polymer latex and the suspension stabilizer, etc. When the content of the rubbery polymer is relatively small, any procedure is applicable. But, when the amount of the rubbery polymer is increased, the adoption of the procedure (a) is recommended for making coagulation easily. Generally speaking, finer particles are obtainable by the increase of the amounts of the water phase and/or the suspension stabilizer or by agitating vigorously so as to carry out the coagulation gradually. In any event, the presence of the suspension stabilizer at the coagulation stage is essential, and such presence is quite effective in preventing the coagulated particles, particularly of non-crosslinked or non-grafted rubber, from becoming too large or making blocks. Still, it may be noted that, compared with conventional procedures, a resin having a higher rubbery polymer content is readily obtainable in the form of beads according to the process of the present invention.

The rubber component to be used in the process of the present invention may be a rubbery polymer optionally grafted with at least one ethylenic monomer. Such rubbery polymer is employed in the form of a latex. As the non-grafted rubbery polymer, there may be used natural or synthetic rubbery polymers such as natural rubber, butadiene rubber, styrene-butadiene copolymer, acrylonitrile-butadiene copolymer, isoprene rubber, chloroprene rubber, acrylic rubber, ethylene-propylene-diene terpolymer and ethylene-vinyl acetate copolymer. These polymers may be cross-linked or not. The grafted rubbery polymer may be the one obtained by graft polymerizing one or more ethylenic monomers on any of the said natural or synthetic rubbery polymers. These rubbery polymers may be used alone or in combination.

As the monomer component to be polymerized onto the rubber component, there may be used vinyl monomers, vinylidene monomers, vinylene monomers, etc. More specifically, the following monomers are exemplified: styrenic monomers (e.g. styrene, α-methylstyrene, o-ethylstyrene, o-chlorostyrene, p-chlorostyrene, divinylbenzene), acrylo-nitrile and its related compounds (e.g. acrylonitrile, α-chloroacrylonitrile, vinylidene cyanide), acrylic acid and its esters (e.g. acrylic acid, methyl acrylate, ethyl acrylate), methacrylic acid and its esters (e.g. methacrylic acid, methyl methacrylate, ethyl methacrylate, glycidyl methacrylate), vinyl esters (e.g. vinyl acetate), vinyl and vinylidene halides (e.g. vinyl chloride, vinylidene chloride), vinylketone, acrylamide, vinylpyrrolidone, maleic anhydride, maleimide, etc. These monomers may be employed alone or in combination.

The said ethylenic monomers may be also used as the monomer component to be grafted on the natural or synthetic rubbery polymers as above mentioned for preparation of the grafted rubbery polymer.

As to the proportion of the rubber component and the monomer component, there is no particular limitation. In general, however, it is preferred to adopt such proportion as to make a rubbery polymer content of 3 to 60% by weight in the ultimately produced polymer resin.

As the coagulating agent, there may be used any conventional one such as organic or inorganic acids (e.g. sulfuric acid, hydrochloric acid, phosphoric acid, acetic acid), metal salts (e.g. sodium sulfate, magnesium sulfate, calcium chloride, zinc sulfate, aluminum sulfate) or high polymeric coagulants (e.g. polyacrylamide).

These coagulating agents may be employed alone or in combination. The amount of the coagulating agent may be usually from 0.01 to 10 parts, preferably from 0.05 to 5 parts based on the weight of 100 parts of the latex.

The suspension stabilizer may be also a conventional one. For instance, there are usable fine powders of inorganic compounds hardly soluble in water (e.g. magnesium carbonate, tertiary calcium phosphate), natural or synthetic water-soluble high polymeric materials (e.g. starch, gelatin, partially saponified polyvinyl alcohol, polyalkylene oxide, sodium polyacrylate, polyvinylpyrrolidone, methyl cellulose, hydroxyethyl cellulose, hydroxypropyl methyl cellulose), etc. These suspension stabilizers may be used alone or in combination. Further, they may be incorporated into the polymerization system from the beginning of the polymerization or portionwise during the polymerization. The amount of the suspension stabilizer may be usually from 0.02 to 5 parts, preferably from 0.05 to 2 parts based on the weight of 100 parts of the monomers to be polymerized.

No particular limitation is present about the amount of water on the coagulation of the rubbery polymer latex. Generally, however, it is favored to use such an amount of water as affording a weight ratio of 1:1-5 in the proportion of the combined amount of the rubber component and the monomer component and the amount of water at the stage of the transference to suspension polymerization. In most cases, it is desirable to increase the amount of water with the increase of the rubber component.

Coagulation of the rubbery polymer latex can be readily accomplished by admixing the rubbery polymer latex with water containing the suspension stabilizer and the coagulating agent to give a stable aqueous dispersion of the coagulated particles of the rubbery polymer.

To the thus obtained dispersion of the coagulated particles of the rubbery polymer, the monomer component is added, and then the resultant mixture is subjected to suspension polymerization.

The suspension polymerization may be carried out by a per se conventional procedure, for instance, using a polymerization initiator and a chain transfer agent or applying heat or ionizing radiation thereto.

As the polymerization initiator, there may be used various radical initiators, particularly organic radical initiators such as azo compounds (e.g. 2,2'-azobisisobutyronitrile, 2,2'-azobis(2,4-dimethylvaleronitrile)) and organic peroxides (e.g. diisopropyl peroxydicarbonate, lauroyl peroxide, di(3,5,5-trimethylhexanoyl) peroxide, benzoyl peroxide, t-butyl peroxy-2-ethylhexanoate, t-butyl peroxybenzoate, t-butyl peroxylaurate, dicumyl peroxide, t-butyl cumyl peroxide, t-butyl peroxide). They may be used alone or in combination. Among them, the use of an organic peroxide is especially recommended when the production of a polymer resin of high impact resistance is aimed at. The polymerization temperature may be appropriately set in association with the decomposition temperature of the polymerization initiator.

As the chain transfer agent, there may be employed any material having a chain transference ability. For instance, alkyl halides, alkyl sulfides, alkyl disulfides, 1,4,5,8-tetrahydronaphthalene, terpinolene, thioglycolic esters, α-methylstyrene dimer and the like are usable. Among them, the use of alkylmercaptans is especially preferred.

Into the thus prepared polymer resin, conventional additives such as lubricants, plasticizers, oxidation stabilizers, coloring agents and foaming agents may be incorporated. These additives may be, if desired, incorporated into the polymerization system prior to the polymerization.

Practical and presently preferred embodiments of the present invention are illustratively shown in the following Examples wherein parts and % are by weight. In these Examples, the impact strength is indicated by a Charpy impact strength with notch determined at 20° C. according to JIS (Japanese Industrial Standard) K-6745, and the melt flow index represents the value determined under the conditions of a temperature of 230° C. and a pressure of 2.16 kg/cm$^2$ according to JIS K-6758.

EXAMPLE 1

A glass-lined autoclave of 100 liter volume equipped with a turbine type agitating blade and provided with a baffle plate on the wall was flushed with nitrogen gas, and a solution of anhydrous magnesium sulfate (2 parts), partially saponified polyvinyl alcohol ("Gosenol GH-20" manufactured by Nippon Synthetic Chemical Industry Co., Ltd.) (0.42 part) and hydroxypropyl methyl cellulose ("Metrose 90 SH-100" manufactured by Shin-Etsu Chemical Industry Co., Ltd.) (0.18 part) in water (600 parts) was charged therein. ABS latex (100 parts) was added thereto in 5 minutes while stirring at 200 rpm. Acrylonitrile (48 parts) and styrene (112 parts) were then charged into the autoclave in 2 minutes, and lauroyl peroxide (1.12 parts) as a polymerization initiator, t-dodecylmercaptan (0.72 part) as a chain transfer agent and a solution of tris-nonyl phenyl phosphite (1.0 part) as an oxidation stabilizer in styrene (4 parts) were further added thereto. Polymerization was carried out at 75° C. for 3.5 hours and at 80° C. for 0.5 hour. After removal of unreacted monomers by steam distillation, the resulting product was dehydrated and dried to give beautiful, spherical beads of 0.42 mm in weight average particle size.

The beads (100 parts) were admixed with calcium stearate (0.5 part) and 3,5-di-t-butyl-4-hydroxytoluene (0.3 part), and the resulting uniform mixture was molded by the aid of an injection molding machine at 260° C. to give a test piece having a very good gloss on the surface. The impact strength and the melt flow index were 13.8 kg.cm/cm$^2$ and 2.8 g/10 min, respectively.

EXAMPLES 2 to 16

In the same manner as in Example 1 except that the conditions as shown in Table 1 were adopted, polymerization was carried out.

In Examples 2 to 8, ABS resins were produced using ABS latex as the rubber component. In Examples 9 and 10, SBR latex was used as the rubber component for production of ABS resins. In Examples 11 to 13 and 14 to 15, there were respectively produced impact resistant polystyrenes and transparent MBS resins by the use of SBR latex as the rubber component. In Example 16, a wethering resistant resin was produced by the use of polybutyl acrylate (BA) latex.

In all of these Examples, the conversion into a suspension system could be effected readily without any difficulty to give spherical beads having a narrow distribution of particle size.

The results are shown in Table 1, from which it may be understood that the products have excellent impact resistance, flow property and appearance.

EXAMPLE 17

In the same manner as in Example 1 except that the monomers were introduced into the reaction system for polymerization after addition of the coagulating agent to a mixture of the latex and an aqueous solution of the suspension stabilizer for breaking the latex, polymerization was carried out.

As the result, there were obtained spherical beads of 0.47 mm in weight average particle size. The gloss of a test piece obtained by molding of the beads was good, and the impact strength and the melt flow index were 14.0 kg.cm/cm$^2$ and 2.7 g/10 min, respectively.

EXAMPLE 18

In the same manner as in Example 1 except that a mixture of ABS latex (50 parts) as used in Example 1 and SBR latex (20 parts) as used in Example 9 was employed, polymerization was carried out.

As the result, there were obtained spherical beads of 0.49 mm in weight average particle size. The gloss of a test piece obtained by molding of the beads was good, and the impact strength and the melt flow index were 13.6 kg.cm/cm$^2$ and 3.1 g/10 min, respectively.

EXAMPLE 19

In the same manner as in Example 3 except that a mixture of ABS latex (150 parts) as used in Example 1 and SBR latex (20 parts) as used in Example 9 was employed, polymerization was carried out.

As the result, there were obtained spherical beads of 0.64 mm in weight average particle size. The gloss of a test piece obtained by molding of the beads was good, and the impact strength and the melt flow index were 25.5 kg.cm/cm$^2$ and 2.9 g/10 min, respectively.

COMPARATIVE EXAMPLE

As in Example 9 or 10 except that a suspension stabilizer was not used on the coagulation of SBR latex, the latex was added to a water phase containing the coagulating agent. As the result, the latex was coagulated to make blocks and could not be polymerized.

Table 1

| Example | Latex*(1) kind used | Latex*(1) Amount (parts) | Monomer*(2) AN | Monomer*(2) ST | Monomer*(2) MMA | Coagulating agent Kind | Coagulating agent Amount (parts) | Polymerization initiator*(3) Kind | Polymerization initiator*(3) Amount used (parts) | Amount mercaptan (parts) | t-Dodecyl- (parts) | Suspension stabilizer*(4) Kind | Suspension stabilizer*(4) Amount time (parts) | Temperature (°C)/size (hrs) | Weight average particle strength (mm) | Impact (g/10 kg.cm/cm²) | Melt flow index (min) | Appearance |
|---|---|---|---|---|---|---|---|---|---|---|---|---|---|---|---|---|---|---|
| 1 | ABS | 100 | 48 | 112 | — | MgSO₄ | 2 | LPO | — | 1.12 | 0.72 | PVA/HPMC | 0.42/0.18 | 75/3.5 →80/0.5 | 0.42 | 13.8 | 2.8 | White, good gloss |
| 2 | " | 150 | 42 | 98 | — | " | 3 | " | — | 0.98 | 0.98 | " | 0.42/0.18 | 75/3 →80/0.5 | 0.47 | 18.2 | 3.1 | " |
| 3 | " | 200 | 36 | 84 | — | " | 4 | " | — | 0.84 | 0.96 | " | 0.54/0.26 | 70/4 →80/0.5 | 0.61 | 26.4 | 2.7 | " |
| 4 | " | 300 | 24 | 56 | — | " | 6 | " | — | 0.56 | 0.80 | " | 0.54/0.26 | 70/2 →80/0.5 | 0.78 | 32.7 | 2.3 | " |
| 5 | " | 100 | 48 | 112 | — | " | 2 | " | — | 1.12 | 0.96 | " | 0.54/0.26 | 75/3.5 →80/0.5 | 0.44 | 12.3 | 7.2 | " |
| 6 | " | 100 | 48 | 112 | — | Al₂(SO₄)₃ | 0.2 | NPO | — | 0.80 | 0.72 | HPC | 0.60 | 70/4 →80/0.5 | 0.42 | 14.1 | 2.9 | " |
| 7 | " | 100 | 48 | 112 | — | " | 0.2 | CPO | — | 0.16 | 0.72 | " | 0.60 | 125/2 →130/1 | 0.50 | 13.6 | 3.3 | " |
| 8 | " | 100 | 48 | 112 | — | " | 0.2 | BPO | — | 0.96 | 0.72 | " | 0.60 | 85/4 →95/1 | 0.46 | 14.2 | 2.7 | " |
| 9 | SBR | 40 | 54 | 126 | — | MgSO₄ | 0.10 | LPO | — | 1.6 | 0.72 | PVA/HPMC | 0.54/0.26 | 75/4 →80/1 | 0.55 | 12.9 | 4.6 | " |
| 10 | " | 60 | 51 | 119 | — | " | 0.15 | " | — | 1.6 | 0.85 | " | 0.54/0.26 | 75/4 →80/1 | 0.72 | 17.6 | 4.2 | " |
| 11 | " | 40 | — | 180 | — | " | 0.10 | BPO/BPB | — | 0.90/0.54 | 0.18 | " | 0.54/0.26 | 90/3 →110/2 | 0.58 | 11.4 | 7.9 | " |
| 12 | " | 60 | — | 170 | — | " | 0.15 | " | — | 0.85/0.51 | 0.21 | " | 0.54/0.26 | 90/3 →110/2 | 0.73 | 16.9 | 6.1 | " |
| 13 | " | 80 | — | 160 | — | " | 0.20 | " | — | 0.80/0.48 | 0.32 | " | 0.54/0.26 | 90/3 →110/2 | 0.87 | 22.7 | 4.7 | " |
| 14 | " | 40 | — | 54 | 126 | " | 0.10 | LPO | — | 1.8 | 0.54 | " | 0.54/0.26 | 75/4 →80/1 | 0.49 | 12.8 | 4.2 | Colorless, transparent |
| 15 | " | 60 | — | 51 | 119 | " | 0.15 | " | 1.8 | 0.68 | " | | 0.54/ | 75/4 →80/1 | 0.64 | 17.7 | 4.4 | Colorless, transparent |
| 16 | BA | 150 | 42 | 98 | — | " | 0.30 | " | — | 1.8 | 0.84 | PVP | 0.80 | 75/4 →80/1 | 0.71 | 14.6 | 2/6 | White |

Notes:
*(1)ABS latex: pH, 11; ABS content, 40%; ABS composition, 50% of butadiene, 15% of acrylonitrile and 35% of styrene with a grafting yield of 50%; average particle size of graft rubber, 0.3. SBR latex: pH, 11.7; SBR content, 50%; SBR composition, 75% of butadiene and 25% of styrene; gel content, 75%; particle size, 0.27. BA latex: BA composition, 90% of butyl acrylate, 5% of methyl methacrylate, 4% of ethylene glycol dimethacrylate and 1% of triallyl cyanurate; rubber content, 40%; gel content, 97%.
*(2)AN: acrylonitrile. ST: styrene. MMA: methyl methacrylate.
*(3)LPO: lauroyl peroxide. NPO: di-3,5,5-trimethylhexanoyl peroxide. BPO: benzoyl peroxide. BPB: t-butyl peroxybenzoate.
*(4)PVA: partially saponified polyvinyl alcohol. HPMC: hydroxypropyl methyl cellulose. PVP: polyvinyl-pyrrolidone. HPC: hydroxypropyl cellulose.

SBR content, 50%; SBR composition, 75% of butadiene and 25% of styrene; gel content, 75%; particle size, 0.27. BA latex: BA composition, 90% of butyl acrylate, 5% of methyl methacrylate, 4% of ethylene glycol dimethacrylate and 1% of triallyl cyanurate; rubber content, 40%; gel content, 97%.

What is claimed is:

1. A process for preparing polymer resins of high impact resistance which comprises coagulating a latex of a rubbery polymer selected from the group consisting of natural rubber, butadiene rubber, styrene-butadiene copolymer, acrylonitrile-butadiene copolymer, isoprene rubber, chloroprene rubber, acrylic rubber, ethylene-propylene-diene terpolymer and ethylene-vinyl acetate copolymer, said rubbery polymer being grafted or not with at least one ethylenic monomer in the presence of a suspension stabilizer and a coagulating agent to make a stable aqueous suspension of coagulated particles of said rubbery polymer, adding at least one ethylenic monomer to the aqueous suspension and subjecting the resultant mixture to suspension polymerization, said resins having a rubbery polymer content of 3 to 60% by weight.

2. The process according to claim 1, wherein the coagulating agent is used in an amount of 0.01 to 10 parts based on the weight of 100 parts of the latex.

3. The process according to claim 1, wherein the suspension stabilizer is used in an amount of 0.02 to 5 parts based on the weight of 100 parts of the monomers to be polymerized.

4. The process according to claim 1, wherein the ethylenic monomer is a member selected from the group consisting of styrenic monomers, acrylonitrile and its related compounds, acrylic acid and its esters, methacrylic acid and its esters, vinyl esters, vinyl and vinylidene halides, vinylketone, acrylamide, vinylpyrrolidone, maleic anhydride and maleimide.

5. The process according to claim 1, wherein the coagulating agent is a member selected from the group consisting of organic or inorganic acids, metal salts and high polymeric coagulants.

6. The process according to claim 1, wherein the suspension stabilizer is a member selected from the group consisting of fine powders of inorganic compounds hardly soluble in water and natural or synthetic water soluble high polymeric materials.

* * * * *